United States Patent Office 3,450,241
Patented June 17, 1969

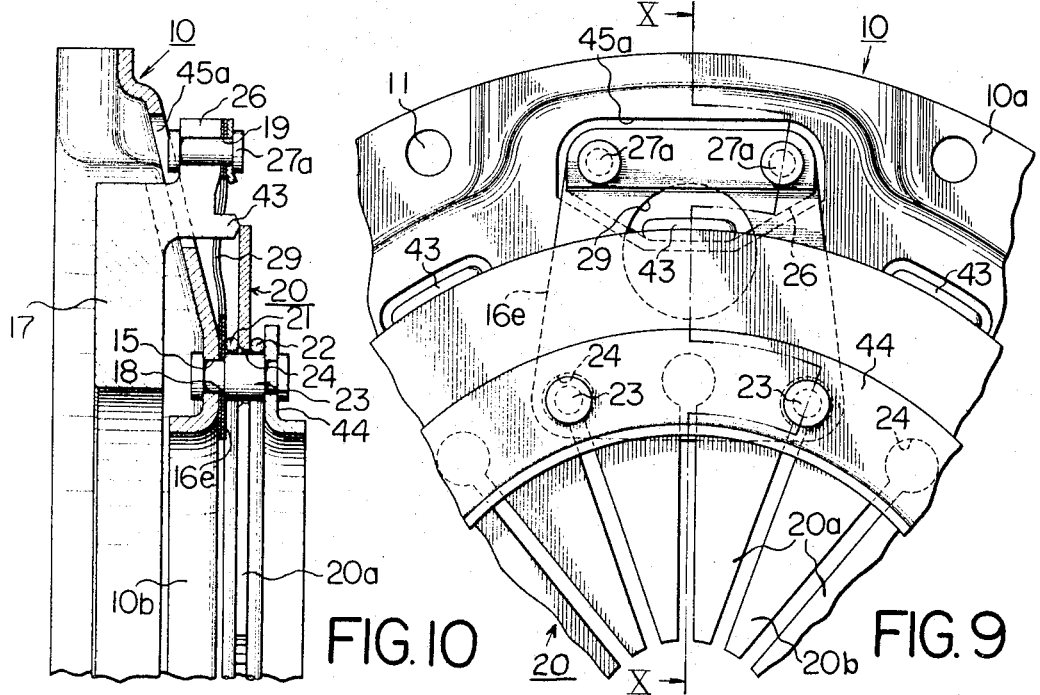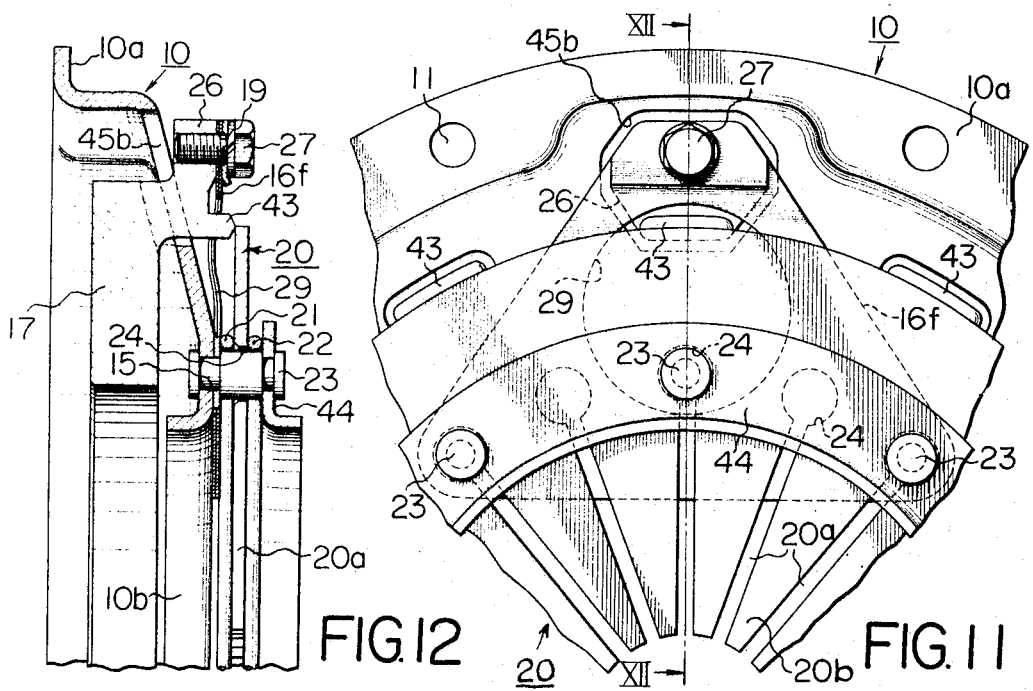

3,450,241
CLUTCH ASSEMBLY
Syozo Kuno, Kariya, Japan, assignor to Aisin Seiki Company Limited, Kariya-shi, Aichi-ken, Japan
Filed Nov. 15, 1967, Ser. No. 683,317
Claims priority, application Japan, Nov. 18, 1966, 41/106,523
Int. Cl. F16d 13/18, 13/44, 19/00
U.S. Cl. 192—70.18                                       7 Claims

ABSTRACT OF THE DISCLOSURE

A clutch assembly for use on an automobile having a plurality of polygonal straps radially arranged within the space defined by the end wall of the clutch cover and the diaphragm spring for connection between the clutch cover and the pressure plate which acts to bring a clutch disc in engaging and disengaging condition.

---

This invention relates to improvements in and relating to clutch assemblies. More specifically, it relates to clutch assemblies for use on wheeled vehicles, especially automotive vehicles. The assembly includes a rotatable clutch cover connected to a rotatable member of the prime-mover side such as an engine flywheel, a diaphragm spring coupled with said cover to rotate in unison therewith, said diaphram being pivotable between its operating and its non-operating position, upon being subjected to a manually controlling effort such as the foot pressure exerted by an operator driving said vehicle, a pressure plate rotatable in unison with said flywheel, said clutch cover and said diaphragm spring and shiftable axially of said assembly between its clutch-engaging and its clutch-disengaging position, depending upon the controlled positions of said diaphram spring by said driver, and a frictional clutch disc arranged between said prime -mover side rotatable member and said pressure plate, and adapted for shifting axially of said assembly depending upon the controlled position of said pressure plate said disc being connected permanently with a driven shaft such as the main drive shaft of said vehicle.

Although the clutch assembly of the above type is especially suitable for automotive use is of relatively small overall dimensions, it is subjected to highly fluctuating torques in use of the clutch, which tendency gives rise to severe vibration of the clutch assembly constituents. Especially recently, there is a strong tendency of increasing the rated power of the automotive engine, so as to adapt to the high speed demands of the automotive cars. This tendency has naturally caused grave efforts to be made for suppressing the possible vibration of clutch components.

In the above kind of clutch, torque must be transmitted from the clutch cover to the pressure plate and thus there must be provided therebetween at least a mechanical connection.

In the boss-drive type automotive clutch, the clutch cover is formed with a plurality of symmetrically arranged openings, opening either radially or axially, so as to receive permanently the correspondingly arranged coupling projections, for attaining a unitary rotation of both. Since there must be inevitable clearances in these symmetrically and locally arranged tongue-and-groove connections, these projections or tongues are liable to receive severe and frequent physical attacks or shocks by the end walls of the coupling grooves in the clutch cover, especially when subjected to highly fluctuating driving torques delivered by the prime mover. These hammering effects cause worn recesses to form on the coupling projections which, when formed, considerably affect adversely upon the desirous smooth operation of the clutch for engaging and disengaging thereof at will of the vehicle driver. In addition, they cause dynamically unbalanced rotation of the clutch parts and severe vibration thereof to take place.

Another conventional type of automotive clutch employs a plurality of symmetrically arranged straps which are connected by its outer extremity with the clutch cover and by its inner extremity with the pressure plate. In this case, however, the pressure plate must be formed with special seats for the reception of the respective ends of the straps, which formation gives rise to a grave difficulty in centered arrangement of said seats about the longitudinal axis of the clutch assembly and invites a considerable dynamic unbalance of the pressure plate, not to speak of the necessary highly trained workmanship in the fabrication.

It is therefore the main object of the invention to provide a highly improved clutch assembly especially adapted for automotive use and of the above kind, characterized by substantially polygonal straps being radially arranged within the space defined by the end wall of said clutch cover and said diaphragm spring; both extremities of the strap are connected rigidly with said cover end wall and said pressure plate, respectively, the inner extremity being connected by connecting means which are otherwise utilized only for the connection of said diaphram spring with said cover end wall.

These and further objects, features and specific advantages of the invention will become more clear when read the following detailed description in conjunction with the drawings, illustrative of several preferred embodiments of the invention by way of example.

In the drawings:

FIG. 9 is part of the driven side end view of a further embodiment of the invention.

FIG. 10 is an axial section thereof taken along the section line X—X in FIG. 9.

FIG. 11 is a part of the driven side end view of a still further embodiment of the invention, and FIG. 12 is an axial section thereof taken on the section line XII—XII in FIG. 11.

Figure 1:
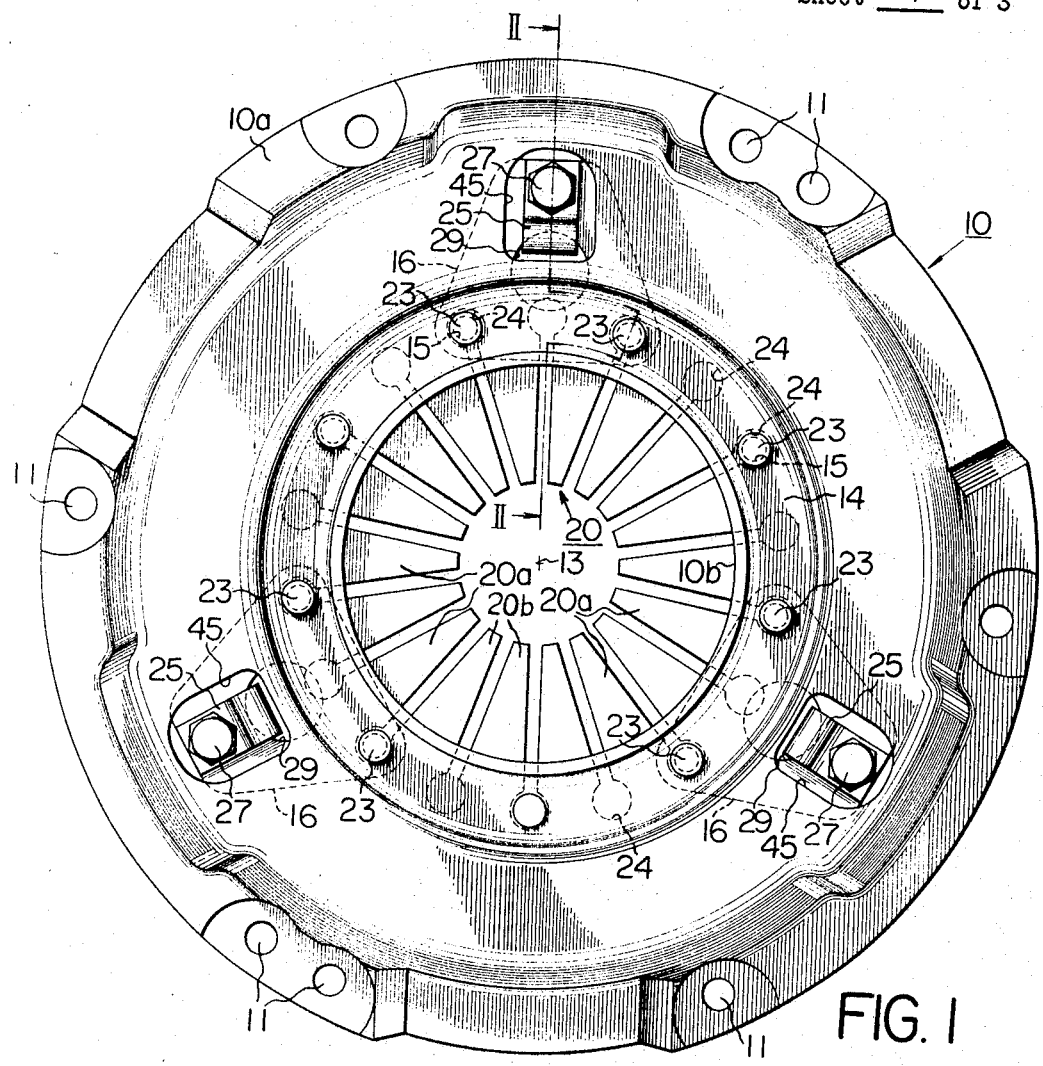
FIG. 1 is an end view of the first embodiment of the invention, when seen from the driven side of the clutch.
Figure 2:
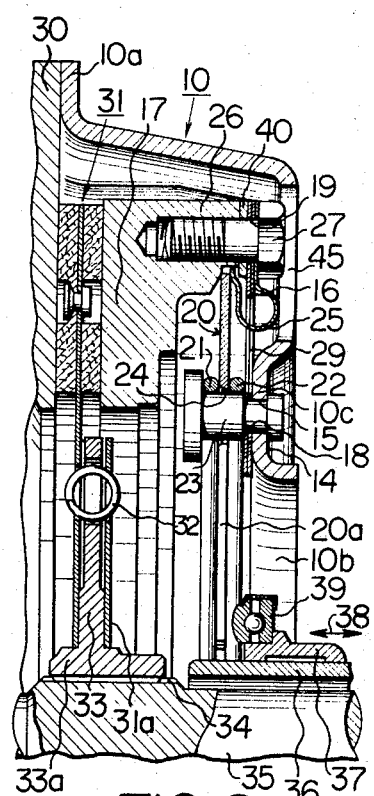
FIG. 2 is substantially in axial section taken along the section line II—II in FIG. 1 and represented on a somewhat reduced scale, wherein however several driven parts are additionally shown for better understanding of the invention.

Now referring to the drawings, especially FIGS 1 and 2 thereof, the numerals 10 generally represent the conventional cover of a clutch assembly embodying the principles of the invention, said cover being formed integrally with a peripheral flange at 10a which is bolted to a conventional flywheel 30, only partially shown, of an automotive engine, not shown. For this bolting purpose, the cover 10 is formed with a number of bolt holes 11 in close proximity to the peripheral edge of said cover, as shown in FIG. 1. As most clearly seen from FIG. 2, the cover 10 has generally a perforated cup-shape, having a large central opening 10b bored through the bottom wall thereof at 10c. In addition, the cover 10 is formed midways along its diameters one to one, with a plurality of small manipulating windows 45, preferably of rectangular shape as shown. Windows 45 are positioned symmetrically and nearer to the peripheral edge of the cover 10 than to center 13.

In close proximity to the central opening 10b, the cover 10 is formed with a circularly closed recess 14 which is provided with a number of, herein nine, rivet holes 15 arranged in a radially symmetrical way, as most clearly seen in FIG. 1. Among said nine holes 15, two serve for fixing each of three straps 16 to a conventional pressure plate 17 having generally the shape of a ring as clearly seen from FIG. 2.

Figure 6:
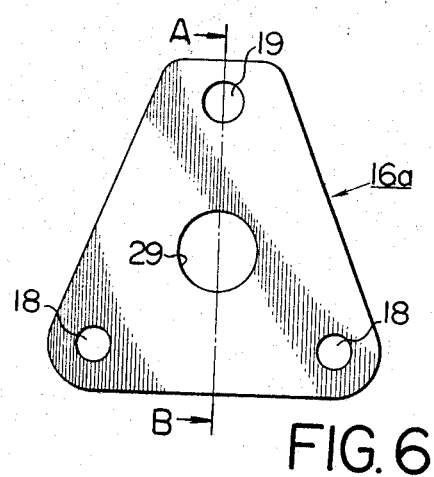
FIG. 6 is a detail plan view of one of the strip's employed in the assembly shown in FIGS. 1 and 2, yet illustrated in a slightly modified configuration.

In FIG. 6, a slightly modified strap is shown generally at 16a. The strap 16 or 16a has substantially a trapezoidal configuration and is provided with two rivet holes 18 positioned in close proximity to its longest or base side edge and a single bolt hole 19 positioned in close proximity to its shortest or top side edge, when seen in FIG. 6.

A conventional diaphram spring 20 having a number of radially and inwardly directing tongues 20a is rigidly connected through the intermediary of pivot rings 21 and 22 with the strap at its base side and cover 10 at the zone of its recess 14 by means of rivets 23 which pass commonly through respective rivet holes 15, 18 and 24, the latter being bored through the diaphram 20 as shown in FIG. 2.

When the diaphram spring 20 is freed of any fixing pressure exerted thereupon when and after assembling in position shown, so as to let the diaphram take its natural configuration, tongues 20a will deflect their respective innermost free ends 20b a small distance from the position shown towards right, when seen in FIG. 2.

The top side of uppermost one the straps 16, when seen in FIG. 1, is fixed together with one end of a retracting spring as at 25, to a shoulder 26 formed on the peripheral zone of pressure plate 17 by means of a screw bolt 27.

The provision of shoulder 26 on the pressure plate 17 may be dispensed with, if desired, especially when the plate has a larger outside diameter or the diaphram 20 has a smaller outside diameter.

Figure 3:
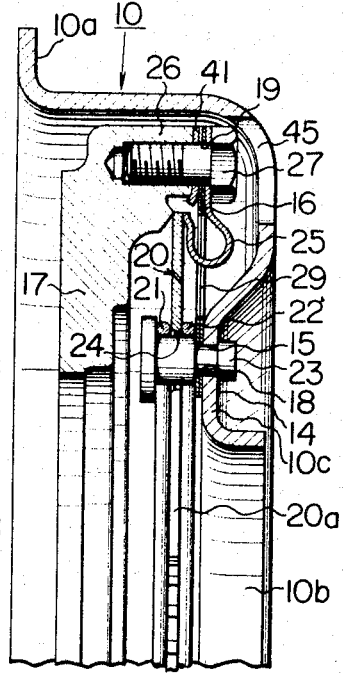
FIG. 3 is a similar, yet slightly simplified section of a modified embodiment from the foregoing.

The retracting spring 25 has a substantially looped cross-section as shown in FIG. 2 or 3. The free end of said spring being kept in a pressure and resilient contact with the peripheral zone of diaphram spring 20, thereby resiliently urging the latter against the shoulder 26 and thus maintaining a pressure contact between the two.

Figures 7, 8:
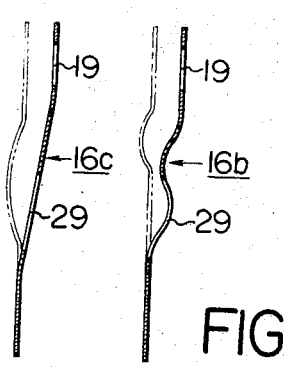
FIGS. 7 and 8 are longitudinal sections of two modifications of the strap, the sections being taken sectional lines corresponding to that A–B shown in FIG. 6.

Retracting springs 25 may be dispensed with if necessary, especially when the straps 16 have a resilient construction as shown in FIGS. 7 and 8 by way of example.

More specifically, the strap 16 or 16a has a planular section when cut in all directions, but those shown at 16b and 16c in FIGS. 7 and 8 have a wavy or crooked longitudinal section which may serve well to provide a resilient urging pressure upon the diaphram spring 20, even when the retracting springs should have been omitted to fit in the clutch assembly.

Although the strap 16 or 16a has been shown as having a trapezoidal configuration, it can be so modified as to have any polygonal form such as triangle, square, quadrilateral or the like, as may be well supposed from the foregoing, although not shown specifically. In practice, the strap consists preferably of a plurality of, herein shown two by way of example, thin steel sheets so as to provide a larger urging pressure than with a unified single piece.

Each of all the straps, including those modified and shown in FIGS. 7 and 8, has a central opening at 29 through which the retracting spring 25 passes without hindrance from the rear side of the strap to the front side therof.

When necessary, fixing bolts 27 can be replaced by rivets. In the similar way, rivets 23 can be replaced by fixing bolts.

When the clutch assembly so far shown and described is kept in its engaging or operative conditions, a conventional frictional clutch disc, generally shown at 31 in FIG. 2, is squeezed under pressure between the engine-side flywheel 30 and the pressure plate 17, and thus rotation is transmitted from the engine side to the clutch parts, as will be more fully described hereinafter.

Clutch disc 31 has a parallel ring 31a made integral therewith and is resiliently connected through a plurality of coil springs 32, only one thereof being shown in FIG. 2, with a driven disc 33 which has a boss 33a made integral therewith. The said boss is operatively connected through a spline coupling 34 with a main drive shaft 35 of the car which is fitted with the clutch assembly so far described. This shaft 35 extends horizontally through said central opening 10b and is connected through a transmission gearing, not shown, to a propeller shaft of the car. Therefore, the shaft 35 is rotatably mounted, although the supporting bearing means are not shown. Concentrically with the drive shaft 35, there is provided a stationary tube shaft 36 which is mounted rigidly on the conventional chassis, not shown, of the car, although the supporting means therefor have been omitted from the drawing only for simplicity.

On the tube shaft 36, a slide 37 is slidably mounted so as to move to and fro, as hinted by a double-headed arrow 38, and mounts in turn rigidly conventional release bearing means 39 which is connected with a clutch pedal fitted commonly at the operator's seat for being controlled at the will of the operator, as is conventional.

These driving and driven arrangements relative to the clutch assembly are highly and conventionally known to those skilled in the art and thus no further detailed description will be necessary to set forth, for better understanding of the present invention.

The operation of the clutch assembly so far described is as follows:

In FIGS. 1 and 2, the clutch assembly is shown in its working conditions. When it is assumed that the automotive engine is running, motion is transmitted therefrom through the flywheel 30 to clutch disc 31, thence through coil springs 32, driven disc 33, and spline coupling 34 to the main drive shaft 35.

Rotation is similarly transmitted from flywheel 30 to clutch cover 10 on account of the direct coupling thereof with the former, thence through fixing rivets 23, straps 16 and fixing bolts 27 to pressure plate 17 which is therefore kept in rotation at the same speed with that of the rotating flywheel 30. Therefore, the clutch disc 31 is not subject to a severe rotary friction by the flywheel or the pressure plate. In this case, retracting spring 25 exerts a resilient pressure upon the diaphragm spring proper so as to keep the latter in pressure contact with pressure plate 17 at its shoulder 26. Under these conditions, the diaphragm spring exerts a strong resilient pressure upon the clutch disc 31 through pressure plate 17, for positively keeping the disc in its engaging position shown in FIG. 2, because the corresponding heavy spring action is generated by the diaphragm spring 20 which is forcibly kept at their neutral position shown.

When it is desired to disconnect the clutch from the engine side under these operating conditions, the car driver must depress the clutch pedal, not shown, so as to advance the slide 37, together with release bearing means 39, along the tube shaft 36, until the bearing is brought into contact with tongues 20a of the diaphragm spring 20.

With further exerted foot pressure upon the clutch pedal, the release bearing 39 is further advanced in the left-hand direction in FIG. 2, and thus a further accentuated foot force is applied to the tongues 20a which are thereby caused to suddenly deflected reversedly from the so-to-speak neutral position shown in FIG. 2, as commonly and similarly known in the case of a snap spring switch, thus a strong swivelling effort in the clockwise direction in FIG. 2 being transmitted to the diaphragm spring proper and the latter being caused to swivel about pivot rings 21 and 22 as the centre and urging pressure is therefore transmitted by the diaphragm spring through the retracting springs 25 and bolts 27 to pressure plate 17 which is thus moved axially in the right-hand direction when seen in FIG. 2. Therefore, the pressure plate 17 is retracted from the pressure-engaging position with the clutch disc 31 which becomes thus free, and the clutch assembly is brought into its discoupled conditions.

When it is desired to bring the clutch again into its coupled conditions, the driver releases his foot pressure from acting upon the pressure pedal. Then, the accumulated resilient energy in the retracting springs 25 is released and returning pressure will be transmitted therefrom onto the diaphragm spring 20, thus all the constituent parts returning to their original position shown in FIG. 2.

In the modified arrangement where retracting springs have been dispensed with as briefly described hereinbefore, the straps having a crooked or wavy sectional configuration as shown in FIG. 7 or 8 and will act as the retracting springs.

Even if the driver should suddenly depress the clutch pedal, the pressure plate 17 will be manipulated in the desired direction without any play thanks to the specific design and arrangement of the straps 16 which connect the clutch cover 10 with the pressure plate 17 through rivets 23 and bolts 27. Thus there is no fear of play which would allow a relative and circumferential movement between the cover and the pressure plate.

The slightly modified clutch assembly shown in FIG. 3 is substantially similar as the foregoing embodiment. In this modification, bolt washer 40 employed in the foregoing has been somewhat modified in its configuration so as to provide the possibility of deflecting the retracting spring 25. In addition, several driven-side parts denoted 30, 31a, 32, 33, 34, 35, 36, 37, 38 and 39 have been omitted from the drawer for clearer understanding of the configuration as well as arrangement of several inner parts. For better comparison, similar parts as before have been denoted by same reference numerals.

Figure 4:
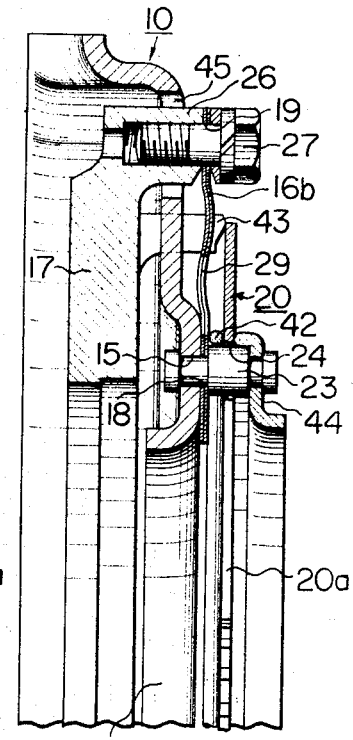
FIG. 4 is a similar axial section taken substantially along the sectional line IV—IV in FIG. 5.
Figure 5:
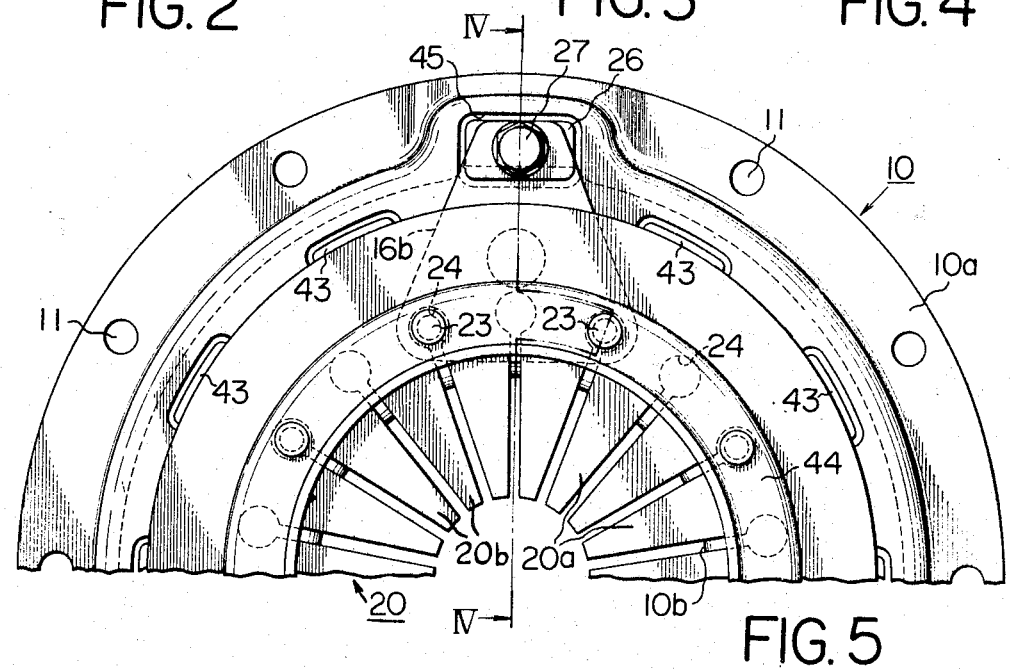
FIG. 5 is a similar end view to FIG. 1, which is however shown substantially half only and in a somewhat reduced scale.

In a further embodiment of the invention shown in FIGS. 4 and 5, the retracting springs 25 have been omitted and instead, the strap representatively shown at 16d in FIG. 4 has a wavy sectional form so as to provide sufficient retracting force. These features have been briefly described hereinbefore. A further different feature from the foregoing consists of replacing the foregoing two pivot rings 21 and 22 by a single one shown at 42.

Still further, the diaphragm spring 20 is arranged outside of the clutch cover 10 in place of the inside arrangement in the foregoing embodiments. For this purpose, there are provided a plurality of radially symmetrically arranged support projections 43 made integral with pressure plate 17 for abuttingly mounting the outer peripheral zone thereof. An auxiliary member 44 shaped into a short hollow tube having a Z-shaped wall section when cut axially is fixedly attached to the fixing rivets 23. In this case, the diaphragm spring 20 has been also arranged outside of the clutch cover 10. In addition, a part of the pressure plate 17 projects through an opening 45 cut through the clutch cover 10 and otherwise effective for bolting purpose. This opening 45 appears also in all of the foregoing embodiments. As may be easily supposed, the function of this embodiments is substantially same as before. But, the assembly procedures may be considerably simplified. If, however, it is desired to realize a more compact clutch, the foregoing embodiments are rather recommendable.

In a still another embodiment shown in FIGS. 9 and 10, the strap at 16e has substantially square configuration in place of trapezoidal shapes employed in the foregoing. Fixing bolts 27 have been replaced by rivets as at 27a. Through openings 45a which have been considerably enlarged and modified in its configuration into an irregular hexagon. The provision of such larger straps will assure a more effective resilient connection between the clutch cover 10 and the pressure plate 17 without loss of centred mounting of thereof.

In a still further embodiment shown in FIGS. 11 and 12, the strap at 16f has been modified so as to have substantially triangular configuration. The opening at 45b formed through the clutch cover has been modified so as to have substantially an octagonal configuration.

The working modes of the last two embodiments could be easily understood from the foregoing description, especially as described in reference to FIGS. 4 and 5, and thus no further analysis would be necessary for understanding the gist and operation of the present invention.

From the foregoing, it would be clear that according to the present invention a comparatively compact and well dynamically balanced clutch assembly can be provided.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description.

What is claimed is:

1. In a clutch assembly for use on a wheeled vehicle having an engine flywheel; a rotatable clutch cover connected to said flywheel; a diaphragm spring connected to said cover for rotation in unison therewith and pivotably mounted for movement between an operating and a non-operating position in response to manually controlled pressure, said diaphragm defining a space with said clutch cover; a pressure plate mounted for rotation with said flywheel, clutch cover and diaphragm spring and being shiftable between clutch-engaging and clutch-disengaging positions by said diaphragm spring; and a frictional clutch disc arranged between said flywheel and said pressure plate and adapted for axial movement of said assembly under control of said pressure plate, said disc being permanently connected to a driven shaft, the improvement comprising: substantially polygonal straps radially arranged within said space defined by said diaphragm spring and said clutch cover, one extremity of said straps being connected to said clutch cover and the other extremity being connected to said pressure plate, the connection of said one extremity being by means which are otherwise utilized only for the connection of said diaphragm spring with said cover end wall.

2. A clutch assembly as set forth in claim 1, wherein the diaphragm spring is mounted within the interior space of the clutch cover.

3. A clutch assembly as set forth in claim 1, wherein said diaphragm spring is mounted outside of the clutch cover.

4. A clutch assembly as set forth in claim 1, wherein said straps are mounted within the interior space of the clutch cover.

5. A clutch assembly as set forth in claim 1, wherein said straps are mounted outside of the clutch cover.

6. A clutch assembly as set forth in claim 1, wherein said pressure plate is formed with a plurality of symmetrically arranged supporting projections passing with clearance through the wall of the clutch cover and being adapted for mounting the diaphragm spring outside of the clutch cover.

7. A clutch assembly as set forth in claim 1, wherein said pressure plate is formed with a plurality of symmetrically arranged supporting projections passing with clearance through the wall of the clutch cover and adapted for mounting one end of each of the straps.

References Cited

UNITED STATES PATENTS

| Re. 21,937 | 11/1941 | Wemp | 192—70.18 |
| 1,907,915 | 5/1933 | Wemp | 192—70.17 |
| 1,944,337 | 1/1934 | Wemp | 192—99 XR |
| 2,724,475 | 11/1955 | Thelander. | |
| 2,770,341 | 11/1956 | Wobrock | 192—89 XR |
| 3,283,864 | 11/1966 | Motsch | 192—89 XR |
| 3,300,007 | 1/1967 | Motsch | 192—89 XR |
| 3,361,239 | 1/1968 | Binder | 192—99 XR |

BENJAMIN W. WYCHE III, *Primary Examiner.*

L. J. PAYNE, *Assistant Examiner.*

U.S. Cl. X.R.

192—89